March 31, 1964   W. L. JENNINGS ETAL   3,126,793
ROTARY TOOL
Filed Aug. 1, 1960
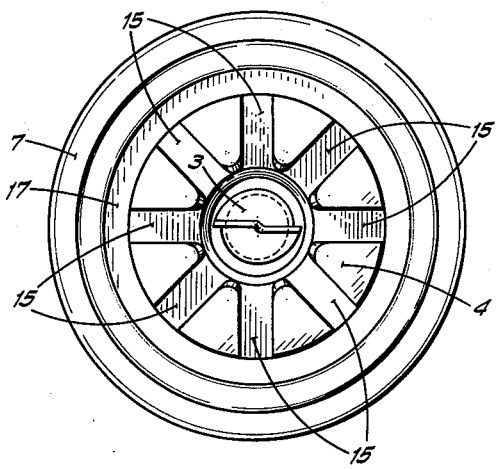
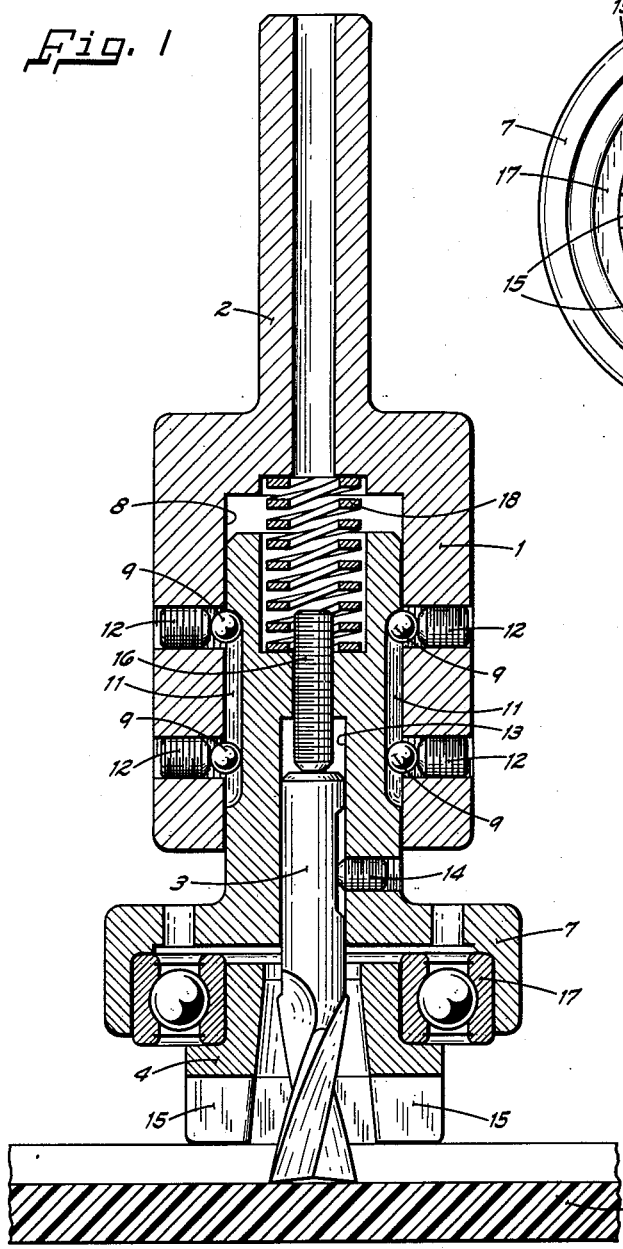
INVENTORS.
WILLIAM L. JENNINGS
ROBERT E. BAKER
BY
Joseph A. Gemignani
ATTORNEY United States Patent Office 3,126,793
Patented Mar. 31, 1964

3,126,793
ROTARY TOOL
William L. Jennings, Pittsburgh, and Robert E. Baker, Washington, Pa., assignors to McGraw-Edison Company, Milwaukee, Wis., a corporation of Delaware
Filed Aug. 1, 1960, Ser. No. 46,549
6 Claims. (Cl. 90—62)

This invention relates to tools, more particularly it relates to a rotary tool which is adapted to machine a cut of uniform depth in a workpiece even though the surface of the workpiece is irregular.

Heretofore, where a machining operation was to be made, for example cutting a groove in a workpiece, the desired depth of cut was set by the proper relative positioning of the cutting tool and the workpiece. The cutting tool was fixed relative to the workpiece and where the surface of the workpiece was irregular the depth of the groove would vary and not be uniform.

Our invention contemplates the provision of a tool incorporating a floating cutting tool and means associated with the cutting tool for sensing irregularities in the surface of the workpiece and operative to displace the cutting tool relative to the surface of the workpiece so as to compensate for any such irregularity and maintain a uniform depth of cut.

Accordingly, an object of this invention is the provision of a tool which will machine a cut of uniform depth in a workpiece having an irregular surface.

A more specific object is the provision of a rotary tool in which the cutting tool is displaced in accordance with irregularities in the surface of a workpiece to compensate for such irregularities and machine a groove of uniform depth in the workpiece.

FIG. 1 is a cross sectional view of a rotary tool embodying our invention;

FIG. 2 is a lower plan view of the rotary tool of FIG. 1.

Tools embodying our invention can be used on any one of a number of machines, for example vertical milling machines, horizontal milling machines and jig boring machines. FIG. 1 illustrates our invention as embodied in a rotary milling tool. The milling tool includes a body portion 1 provided with an extension 2 of reduced diameter adapted to be engaged in a suitable chuck. The body 1 is rotatably driven by the machine in which it is used and constiutes the driving member of our rotary tool. A cutting tool 3 is connected to and driven by the body 1 through means which transmits rotation of the body 1 directly to the tool 3 while still permitting axial movement of the tool 3 relative to the body 1. Disposed in surrounding relationship to the tool 3 is a ring gage 4. The ring gage 4 is fixed in axial relation with the cutting tool 3 and is adapted to continuously engage the surface of the workpiece 6 so that during the cutting operation it will respond to any irregularities in the workpiece and displace the cutting tool 3 accordingly. The cutting tool 3 is adjusted to extend beyond the ring gage 4 a predetermined distance equal to the desired depth of cut to be taken and the ring gage 4 will displace the cutting tool 3 in accordance with any irregularities in the surface and relative to the surface of the workpiece so as to maintain the desired predetermined depth of cut.

More specifically, the means by which the cutting tool 3 is connected to the body 1 includes a tool holder 7 which is disposed within a bore 8 provided in the body 1. The tool holder 7 is connected to the body 1 by means of ball bearings 9 which fit into keyway slots 11 provided in the tool holder. The ball bearings 9 are held in the keyways 11 by means of set screws 12. As can be seen in FIG. 1, the keyways 11 are of sufficient length to permit movement of the tool holder 7 relative to the body 1 in an axial direction.

The cutting tool 3 is fixedly held in a bore 13 in the tool holder 7 by means of set screws 14 and 16. The position of the cutting tool 3 within the tool holder 7 is adjustable by the proper manipulation of set screws 14 and 16. The annular ring gage 4 is disposed in surrounding relation with the lower or work engaging end of the cutting tool 3, and includes a plurality of radial openings 15 for the discharge of cutting chips. Roller bearing 17 establishes a connection between the ring gage 4 and the tool holder 7 by means of which the ring gage 4 is held in fixed axial relation with the tool 3. Further, the roller bearing 17 permits the tool holder 7 to rotate relative to the ring gage 4 so that the ring gage 4 remains at rest during the cutting operation so as to offer the least inerference to the cutting operation.

The tool holder 7, the cutting tool 3 and the ring gage 4 are all disposed on a common axis, this axis being the axis of rotation of the tool holder 7 and the cutting tool 3 and being generally perpendicular to the surface of the workpiece 6. Disposed between the unitary assembly and the body 1 is a suitably seated spring 18 which biases the cutting tool 3 and the ring gage 4 toward engagement with the workpiece. It is against this spring which the ring gage 4 must act when, in response to irregularities in the surface of the workpiece, it displaces the unitary assembly along the axis of rotation to vary the position of the cutting tool relative to the surface of the workpiece and maintain a uniform depth of cut.

In operation, the desired depth of cut is determined and the set screw 16 is properly adjusted to have the cutting tool 3 extend beyond the ring gage 4 a distance equal to the desired depth of cut. The set screw 14 is then tightened to hold the cutting tool in position. During the machining operation the ring gage 4, under the influence of spring 18, is in continuous contact with the surface of the workpiece 6. The ring gage senses any irregularities in the surface of workpiece 6 and displaces the above discussed unitary assembly accordingly so that the cutting tool 3 will be displaced relative to the surface of workpiece 6 to maintain a uniform depth of cut. Throughout the machining operation a fixed relationship is held between the ring gage 4 and the cutting tool 3 so that the desired depth of cut is maintained regardless of any irregularities in the surface of the workpiece.

Although our invention has particular application to and has been discussed in relation with rotary tools, it should be understood that it is not considered as being limited to this particular class of cutting tools but has application beyond rotary tools. It is our intention in the appended claims to cover all modifications and embodiments which fall within the true spirit and scope of our invention.

We claim:

1. A rotary tool, adapted to machine a groove of uniform depth in a workpiece, comprising, in combination, a rotatable body, a tool holder connected to said body for rotation therewith and being movable axially relative thereto, a cutting tool adjustably connected to and rotatable with said tool holder, a gage ring surrounding a portion of said cutting tool and engaging the surface of said workpiece for sensing irregularities therein, means for connecting said gage ring to said tool holder and operative to hold said gage ring in fixed axial relation with said cutting tool while permitting rotation of said tool holder relative to said gage ring, said cutting tool extending beyond said gage ring a distance equal to said groove depth, and a spring seated between said body and said tool holder and biasing said gage ring and said cutting tool toward engagement with said workpiece, whereby said gage ring displaces said cutting tool relative to said body and the surface of said workpiece in accordance with irregularities in said surface to maintain a uniform groove depth.

2. The combination of claim 1 wherein said gage ring includes a plurality of radial openings.

3. A rotary tool, adapted to machine a groove of uniform depth in a workpiece, comprising, in combination, a rotatable body, a tool holder connected to said body for rotation therewith and being movable axially relative thereto, a cutting tool adjustably connected to and rotatable with said tool holder, a gage ring surrounding a portion of said cutting tool and engaging the surface of said workpiece for sensing irregularities therein, means for connecting said gage ring to said tool holder and operative to hold said gage ring in fixed axial relation with said cutting tool while permitting rotation of said tool holder relative to said gage ring, said cutting tool extending beyond said gage ring a distance equal to said groove depth, and means for biasing said gage ring and said cutting tool toward engagement with said workpiece, whereby said gage ring displaces said cutting tool relative to said body and the surface of said workpiece in accordance with irregularities therein to maintain a uniform groove depth.

4. A rotary tool, adapted to machine a groove of uniform depth in a workpiece, comprising, in combination, a rotatable driving member, a driven member connected to said driving member for rotation therewith and being movable axially relative thereto, a cutting tool adjustably connected to and rotatable with said driven member, means engaging the surface of said workpiece for sensing irregularities therein, said cutting tool extending beyond said sensing means a distance equal to said groove depth and said sensing means connected in fixed axial relation to said cutting tool and adapted to displace said cutting tool relative to said driving member and the surface of said workpiece in accordance with said irregularities to maintain said uniform groove depth, and means for biasing said sensing means and said cutting tool toward engagement with said workpiece.

5. A rotary tool, adapted to machine a uniform depth of cut in a workpiece, comprising, in combination, a rotatable driving member, a rotary cutting tool, means for coaxially connecting said cutting tool to said driving member for rotation in unison therewith while permitting axial movement of said cutting tool relative to said driving member, means engaging the surface of said workpiece for sensing irregularities therein, said cutting tool extending beyond said sensing means a distance equal to said depth of cut and said sensing means connected in fixed axial relation to said cutting tool and adapted to displace said cutting tool relative to said driving member and the surface of said workpiece in accordance with said irregularities to maintain said uniform depth of cut, and means for biasing said sensing means and said cutting tool toward said workpiece.

6. A rotary tool, adapted to machine a uniform depth of cut in a workpiece, comprising, in combination, a rotatable driving member, a rotary cutting tool, means for rotatably connecting said cutting tool to said driving member for rotation in unison therewith while permitting axial movement of said cutting tool relative to said driving member, and means engaging the surface of said workpiece for sensing irregularities therein, said cutting tool extending beyond said sensing means a distance equal to said depth of cut and said sensing means connected in fixed axial relation to said cutting tool and adapted to displace said cutting tool relative to said driving member and the surface of said workpiece in accordance with said irregularities to maintain said uniform depth of cut.

References Cited in the file of this patent

UNITED STATES PATENTS

| Re. 20,974 | Guirl et al. | Jan. 10, 1939 |
| 2,126,175 | Dalcher | Aug. 9, 1938 |
| 2,477,891 | O'Neill | Aug. 2, 1949 |
| 2,967,441 | Miles | Jan. 10, 1961 |

FOREIGN PATENTS

| 875,441 | France | June 22, 1942 |
| 858,487 | Germany | Dec. 8, 1952 |